(12) United States Patent  (10) Patent No.: US 9,024,883 B2
Mia  (45) Date of Patent: May 5, 2015

(54) FUNCTIONALLY INTERCHANGEABLE DATA PROCESSING DEVICE HAVING A ROTATABLE DISPLAY UNIT

(71) Applicant: Ahmed Mia, Lenasia North (ZA)

(72) Inventor: Ahmed Mia, Lenasia North (ZA)

( * ) Notice: Subject to any disclaimer, the term of this patent is extended or adjusted under 35 U.S.C. 154(b) by 154 days.

(21) Appl. No.: 13/665,069

(22) Filed: Oct. 31, 2012

(65) Prior Publication Data

US 2013/0106703 A1   May 2, 2013

Related U.S. Application Data

(60) Provisional application No. 61/553,429, filed on Oct. 31, 2011.

(51) Int. Cl.
*G06F 1/16* (2006.01)
*G06F 3/0488* (2013.01)
*H01Q 1/22* (2006.01)
*H01Q 1/24* (2006.01)
*H04M 1/02* (2006.01)

(52) U.S. Cl.
CPC .............. *G06F 1/162* (2013.01); *G06F 1/1643* (2013.01); *G06F 1/1654* (2013.01); *G06F 1/1656* (2013.01); *G06F 1/1692* (2013.01); *G06F 3/04886* (2013.01); *H01Q 1/2266* (2013.01); *H01Q 1/243* (2013.01); *H01Q 1/244* (2013.01); *H04M 1/0233* (2013.01)

(58) Field of Classification Search
CPC ....... H04M 1/725; G06F 1/162; G06F 1/1643
USPC ............... 178/18.01–19.07; 345/168–178
See application file for complete search history.

(56) References Cited

U.S. PATENT DOCUMENTS

| 8,462,123 | B1 * | 6/2013 | Sears ........................... 345/173 |
| 2005/0063149 | A1 * | 3/2005 | Shimamoto et al. .......... 361/683 |
| 2008/0207061 | A1 * | 8/2008 | Mukai et al. ................. 439/676 |
| 2010/0298033 | A1 * | 11/2010 | Lee .............................. 455/566 |

* cited by examiner

*Primary Examiner* — Michael Pervan
(74) *Attorney, Agent, or Firm* — Raj Abhyanker, P.C.

(57) ABSTRACT

A data processing device includes a keypad including a number of keys and appropriate driver components to provide a capability to the data processing device to be used as a mobile phone, a computer and a television, a hinge, and a display unit physically coupled to the keypad through the hinge to enable movement thereof toward and away from the keypad such that the data processing device is in a closed state when a plane of a screen of the display unit faces and contacts a plane of the keypad and in an open state when the plane of the screen of the display unit is approximately perpendicular to the plane of the keypad. The hinge further enables movement of the display unit thereabout such that the plane of the screen of the display unit is away from the keypad in the open state when rotated 180° about the hinge.

17 Claims, 9 Drawing Sheets

FUNCTIONALLY INTERCHANGEABLE DATA PROCESSING DEVICE HAVING A ROTATABLE DISPLAY UNIT

CLAIM OF PRIORITY

This application is a conversion application and claims priority to provisional Application Ser. No. 61/553,429 titled INTERCHANGEABLE MOBILE DEVICE AND DATA PROCESSING UNIT WITH 360 DEGREE SWIVEL filed on Oct. 31, 2011.

FIELD OF TECHNOLOGY

This disclosure relates generally to data processing devices and, more particularly, to methods, an apparatus and/or a system of a functionally interchangeable data processing device having a rotatable display unit.

BACKGROUND

A data processing device (e.g., a mobile phone, a laptop computer) may be limited in utility thereof. For example, a user of a mobile phone may also possess a laptop computer and/or a television. The user may carry both the laptop computer and the mobile phone to work as the laptop computer may include valuable work data and the mobile phone may include phone numbers of contacts thereof. The laptop computer may be bulkier than the mobile phone and, therefore, the process of carrying both the devices may subject the user to inconvenience. Further, the user may forget to carry the mobile phone when mentally occupied.

In an example scenario where the user is on vacation and traveling in a car, the user may desire to watch a film or two scheduled on television to while away the driving time. The mobile phone of the user may not provide a capability therefor. Even though the mobile phone of the user may be a smart phone offering processing and/or storing facilities, the user may be limited by functionalities associated therewith.

SUMMARY

Disclosed are methods, a device and/or a system of a functionally interchangeable data processing device having a rotatable display unit.

In one aspect, a data processing device includes a keypad including a number of keys related to providing a capability to the data processing device to be used as a mobile phone, a computer and a television, a hinge, and a display unit physically coupled to the keypad through the hinge to enable movement thereof toward and away from the keypad such that the data processing device is in a closed state when a plane of a screen of the display unit faces and contacts a plane of the keypad and the data processing device is in an open state when the plane of the screen of the display unit is approximately perpendicular to the plane of the keypad.

The hinge further enables movement of the display unit thereabout such that the plane of the screen of the display unit is away from the keypad in the open state when rotated 180° about the hinge to enable a user of the data processing device utilize the screen solely for viewing content thereon. The data processing device also includes a memory including an operating system executing on the data processing device and a number of driver components related to providing the capability to the data processing device to be used as the mobile phone, the computer and the television, and a processor communicatively coupled to the memory. The processor is configured to execute instructions to provide the mobile phone capability, the computer capability and the television capability to the data processing device.

In another aspect, a method includes providing a keypad including a number of keys, and forming a data processing device through physically coupling a display unit to the keypad through a hinge that enables movement of the display unit toward and away from the keypad such that the data processing device is in a closed state when a plane of a screen of the display unit faces and contacts a plane of the keypad and the data processing device is in an open state when the plane of the screen of the display unit is approximately perpendicular to the plane of the keypad. The hinge further enables movement of the display unit thereabout such that the plane of the screen of the display unit is away from the keypad in the open state when rotated 180° about the hinge to enable a user of the data processing device utilize the screen solely for viewing content thereon.

The method also includes providing a capability to the data processing device to be used as a mobile phone, a computer and a television through the number of keys, and installing a number of driver components in a memory of the data processing device. The number of driver components provides the capability to the data processing device to be used as the mobile phone, the computer and the television. Further, the method includes providing a capability to a processor of the data processing device communicatively coupled to the memory to execute instructions related to providing the mobile phone capability, the computer capability, and the television capability to the data processing device.

In yet another aspect, a method includes providing a capability to a data processing device to be used as a mobile phone, a computer and a television through a number of keys of a keypad of the data processing device and a number of driver components installed on the data processing device, and providing a capability to move a display unit of the data processing device physically coupled to the keypad through a hinge toward and away from the keypad such that the data processing device is in a closed state when a plane of a screen of the display unit faces and contacts a plane of the keypad and the data processing device is in an open state when the plane of the screen of the display unit is approximately perpendicular to the plane of the keypad.

The method also includes enabling movement of the display unit about the hinge such that the plane of the screen of the display unit is away from the keypad in the open state when rotated 180° about the hinge to provide a capability to a user of the data processing device to utilize the screen solely for viewing content thereon.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide methods, a system and/or an apparatus of a functionally interchangeable data processing device having a rotatable display unit. Although the present embodiments have been described with reference to specific example embodiments, it will be evident that various modifications and changes may be made to these embodiments without departing from the broader spirit and scope of the various embodiments.

Figure 1:
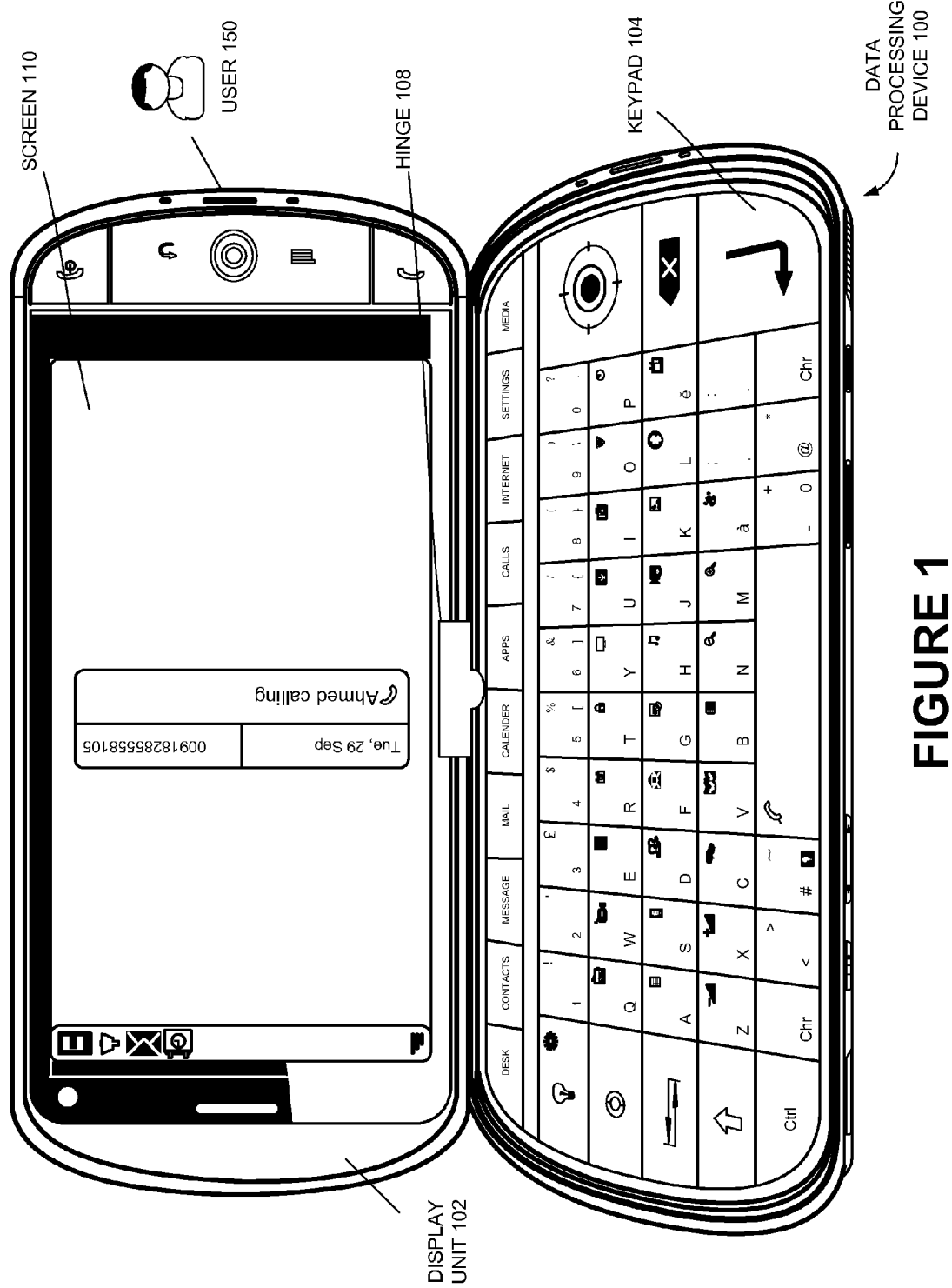
FIG. 1 is a perspective view of a data processing device in an open state thereof, according to one or more embodiments.

FIG. 1 shows a perspective view of a data processing device 100 capable of being used as a mobile phone, a computer and a television, according to one or more embodiments. In one or more embodiments, data processing device 100 may include a display unit 102 capable of being utilized to display a mobile phone screen, a computer monitor/screen and a television screen. In one example embodiment, display unit 102 with respect to a mobile phone may be understood to possess a touchscreen capability. In one or more embodiments, display unit 102 may be physically coupled to a keypad 104 (or, keyboard) that enables a user 150 of data processing device 100 to input data therethrough. In one example embodiment, display unit 102 may be coupled to keypad 104 through a hinge 108 that allows for movement of display unit 102 toward and away from keypad 104 such that data processing device 100 may be in a closed state thereof when a plane of display unit 102 faces and contacts a plane of keypad 104 and in an open state thereof when the plane of display unit 102 is approximately perpendicular to the plane of keypad 104.

Moreover, hinge 108 may enable rotation (e.g., 180°, 360°) of display unit 102 thereabout. In one or more embodiments, hinge 108 may provide for 180° rotation of display unit 102 in the open state thereof discussed above such that a plane of a screen 110 of display unit 102 is away from keypad 104. Through the aforementioned 180° rotation of display unit 102 away from keypad 104, user 150 may be able to have a television-like experience of data processing device 100.

User 150 may be able to configure display unit 102 in accordance with preference(s) thereof, irrespective of whether data processing device 100 is utilized as a television receiving broadcast signals, a mobile phone or a computer. In one or more embodiments, even when display unit 102 is away from keypad 104, screen 110 of display unit 102 may provide for a touchscreen keyboard interface to user 150 so that user 150 may utilize capabilities associated therewith.

The 180° rotation of display unit 102 may enable user 150 to utilize the surface beneath keypad 104 as a stand to hold display unit 102 while user 150 enjoys viewing content on screen 110 (e.g., when user 150 is traveling by car). It is obvious that the touchscreen keyboard interface may enable data processing device 100 to be used as a mobile phone/computer even when display unit 102 is rotated 180° away from keypad 104 during the open state. In one or more embodiments, the keys on keypad 104 may not be limited to functionalities associated with a mobile phone. In one or more embodiments, the keys on keypad 104 may provide functionalities associated with a computer; in addition, the keys may facilitate functionalities associated with a television.

While a QWERTY keypad 104 is shown as an example in FIG. 1, it is obvious that keypad 104 itself may be touchscreen based. For example, keypad 104 may provide a set of virtual buttons/keys for a particular feature (e.g., computer, mobile phone). When user 150 desires to utilizes data processing device 100 for gaming purposes, he/she may merely click a particular virtual button/key depending on the implementation to adaptively modify the virtual buttons/keys of the touchscreen keypad 104 such that the new virtual buttons/keys are tailored toward a gaming experience. Other implementations are within the scope of the exemplary embodiments.

Figure 2:
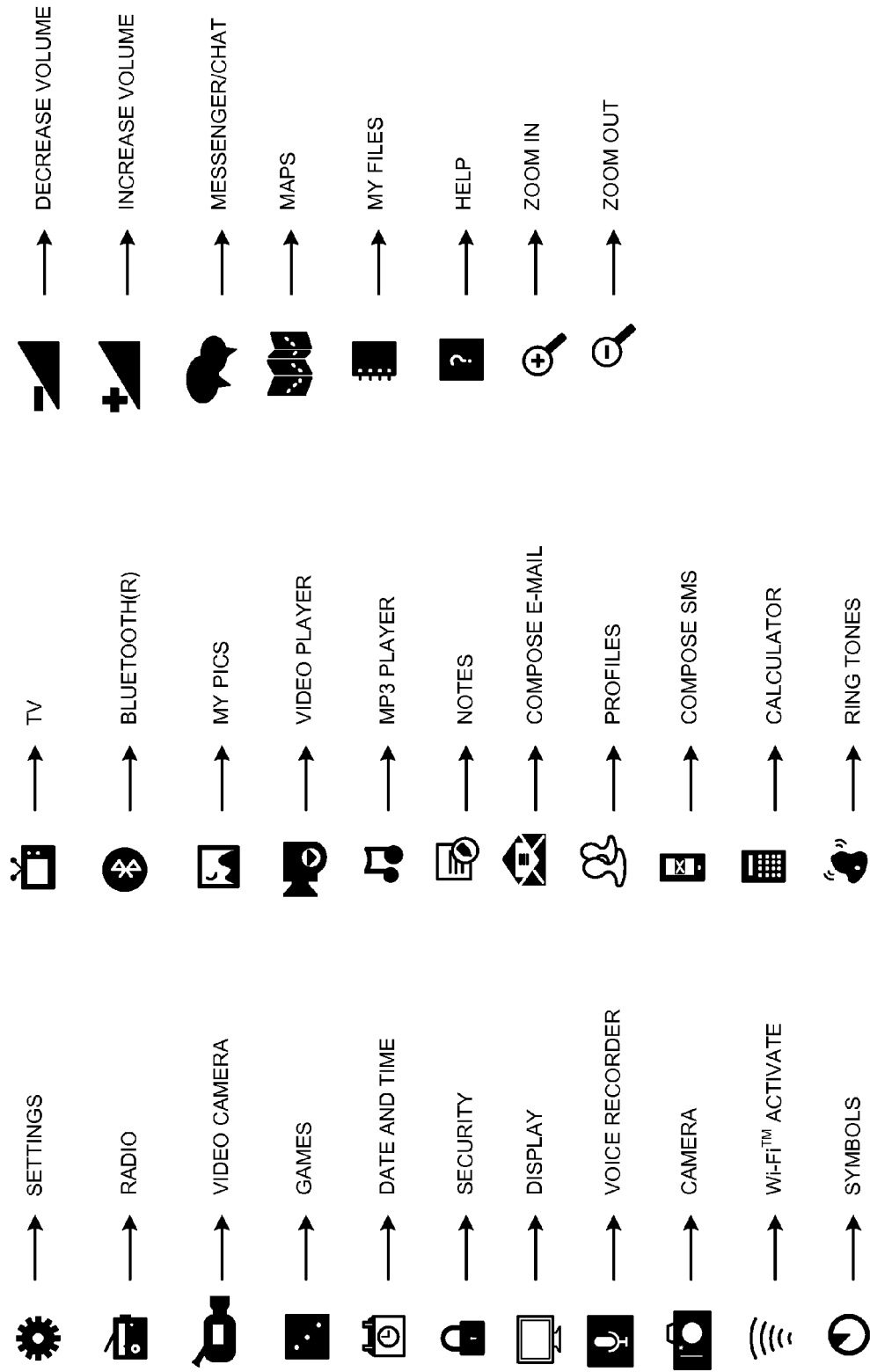
FIG. 2 is an illustrative view of icons related to shortcuts to functionalities provided through a keypad of the data processing device of FIG. 1.

FIG. 2 shows icons related to shortcuts to functionalities provided through keypad 104 of data processing device 100. It is obvious to see from keypad 104 that the functionalities of typing may be augmented with functionalities associated with a television, a mobile phone and a computer. Some functionalities such as Bluetooth® and Wi-Fi™ capability may be common to the mobile phone and the computer features. Other commonalities between two or more of the mobile phone, the television and the computer features are within the scope of the exemplary embodiments discussed herein. As seen in FIG. 1, keypad 104 may also have shortcut keys corresponding to one or more of the aforementioned features such as Contacts, Messages, Mail, Calendar, Apps (short for Applications), Calls, Internet, Media etc. The presence of the aforementioned shortcut keys may enable user 150 to effortlessly switch between features (mobile phone, television, and computer).

Figure 3:
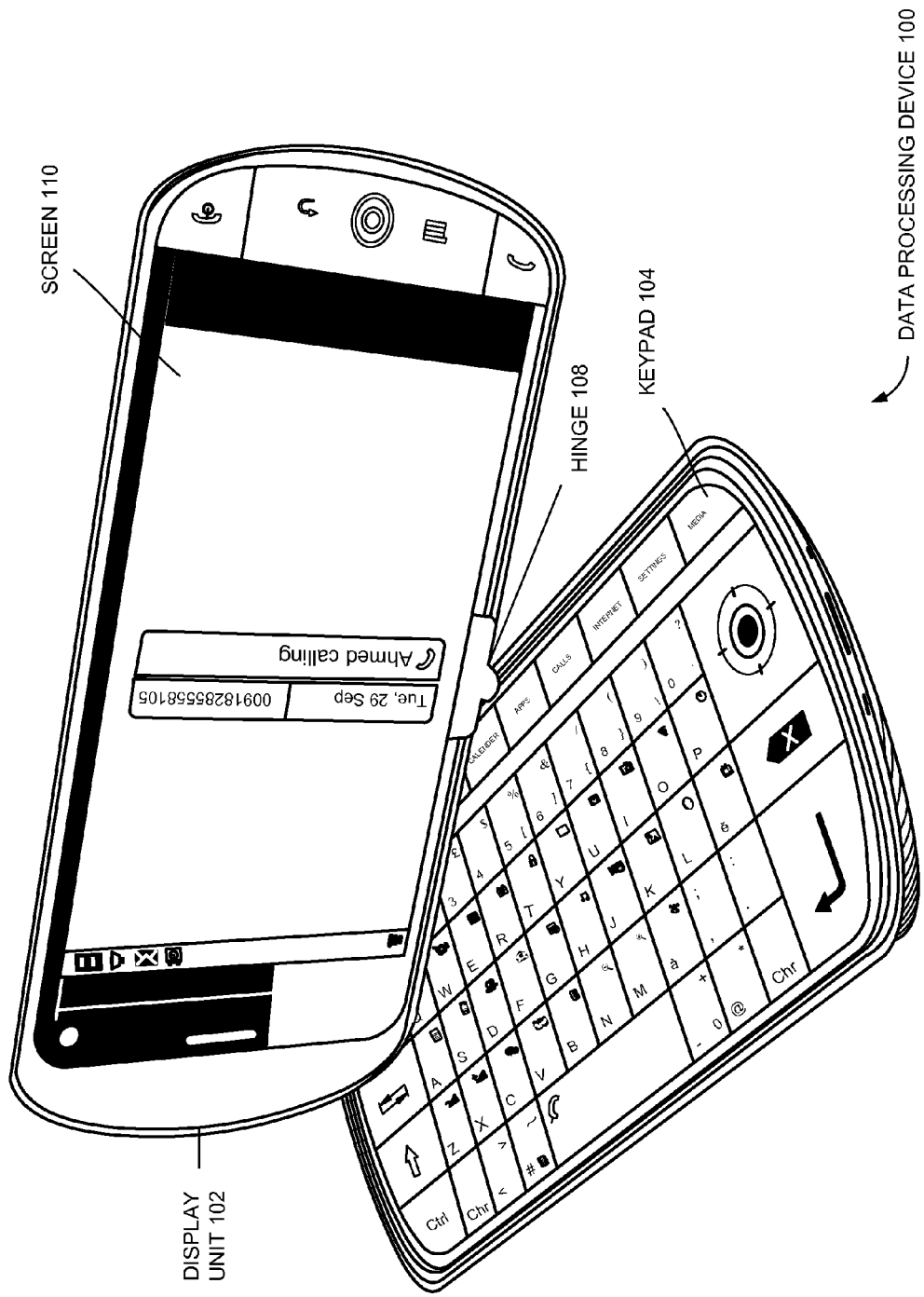
FIG. 3 is a perspective view of rotation of a display unit of the data processing device of FIG. 1 around a hinge in the open state thereof on the way to being completely away from the keypad of FIG. 1, according to one or more embodiments.

Thus, in one or more embodiments, data processing device 100 may include keypad 104 that provides for a self-contained set of functionalities associated with a mobile phone, a computer and a television. FIG. 1 shows data processing device 100 in an open state thereof, according to one or more embodiments. FIG. 3 shows rotation of display unit 102 of data processing device 100 around hinge 108 in the open state thereof on the way to being completely away from keypad 104, according to one or more embodiments. While a 180° rotation may cause display unit 102 to be completely away from keypad 104, it is obvious that a further 180° rotation of display unit 102 around hinge 108 may cause display unit 102 to return back to an original position thereof. In the original position, display unit 102 may be moved (rotated) toward keypad 104 to transit back to the closed state of data processing device 100.

Figure 4:
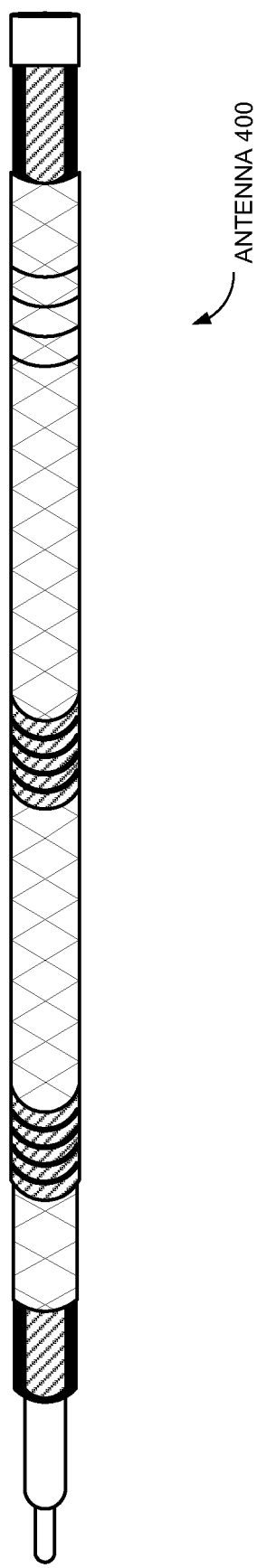
FIG. 4 is a perspective view of an example antenna capable of being utilized in the data processing device of FIG. 1, according to one or more embodiments.

FIG. 4 shows an example antenna 400 capable of being utilized in data processing device 100. In one example embodiment, antenna 400 may be coupled to data processing device 100 directly and available for sale along with data processing device 100. Alternately, antenna 400 may be available from another party and compatible with data processing device 100. Antenna 400 may also be removably coupled to data processing device 100. As will be seen in FIG. 6, data processing device 100 may have an appropriate port to which antenna 400 may be coupled. Alternately, data processing device 100 may have a slot on a body thereof inside which antenna 400 is configured to be inserted to be held therewithin. The slot and antenna 400 may be appropriately designed such that electric coupling between antenna 400 and data processing device 100 may be established.

In one or more embodiments, user 150 may be able to utilize data processing device 100 as a television through coupling antenna 400 thereto. Data processing device may, thus, be able to pick up digital or analog television signals. Appropriate processing capability may be provided in data processing device 100. The aforementioned processing capability is well known to one of ordinary skill in the art and, therefore, detailed discussion associated therewith has been skipped for the sake of brevity, clarity and convenience. Additionally or alternately, antenna 400 may be capable of receiving broadcast radio signals. User 150, therefore, may also utilize data processing device 100 to listen to radio programs.

Figure 5:
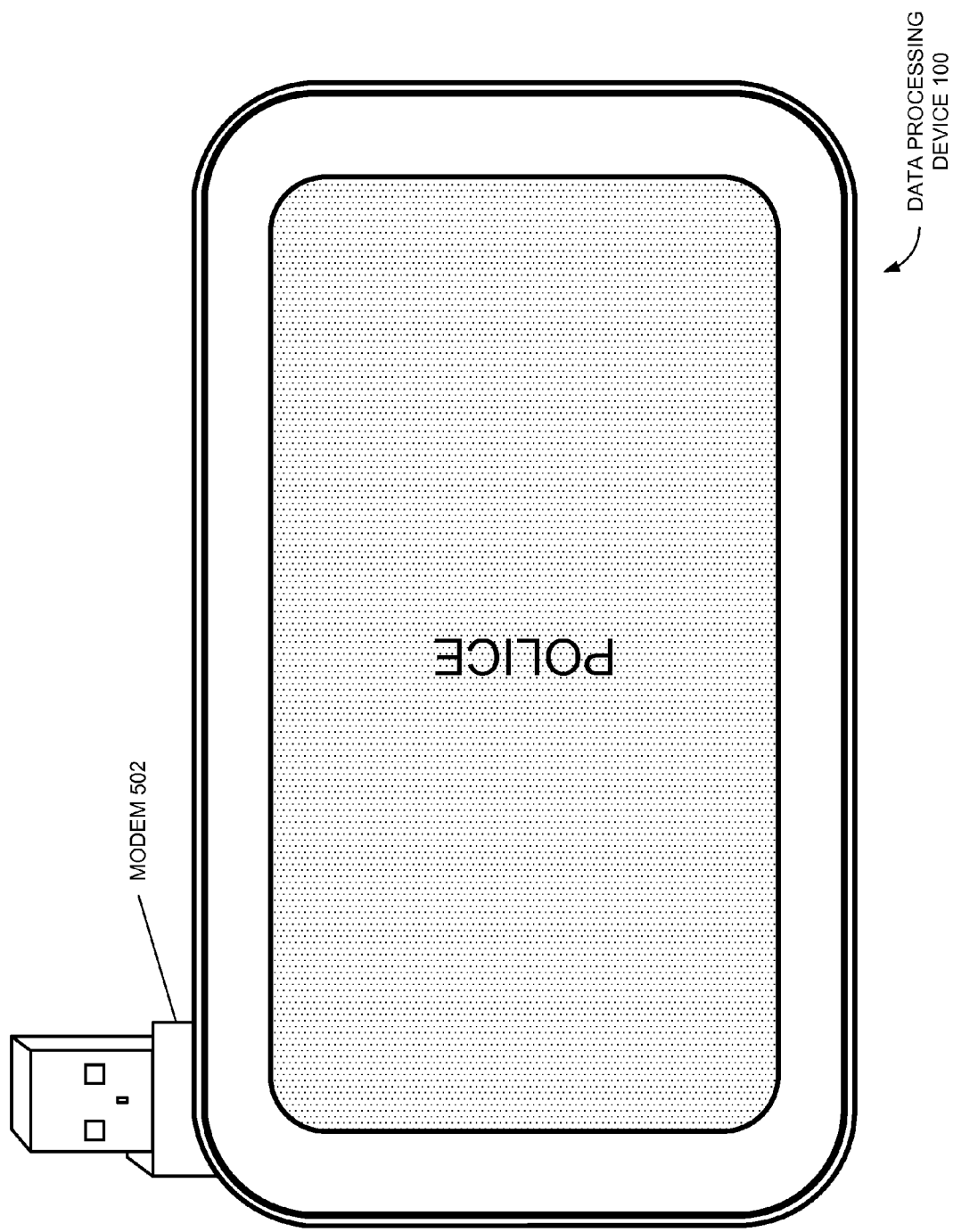
FIG. 5 is a perspective view of the data processing device of FIG. 1 configured to connect to a modem.

In an example scenario, user 150 may be at a location that does not allow for access to a mobile network and/or does not have a hotspot for Internet access through Wi-Fi™. FIG. 5 shows data processing device 100 configured to connect to a modem 502 (with an appropriate port thereon) and, in turn, connect to the Internet through an Internet Service Provider (ISP). In one or more alternate embodiments, modem 502 may be in the form of a modem chip available with data processing device 100. Modem 502 (or modem chip) may be built into data processing device 100 or available as an external modem. In the example embodiment shown in FIG. 5, modem 502 may be Universal Serial Bus (USB) based. User 150 may be able to use modem 502 during use of data processing device 100 as a computer and/or as a mobile phone. In certain embodiments, user 150 may require a modem adapter to connect to modem 502 and, further, to the Internet.

Figure 6:
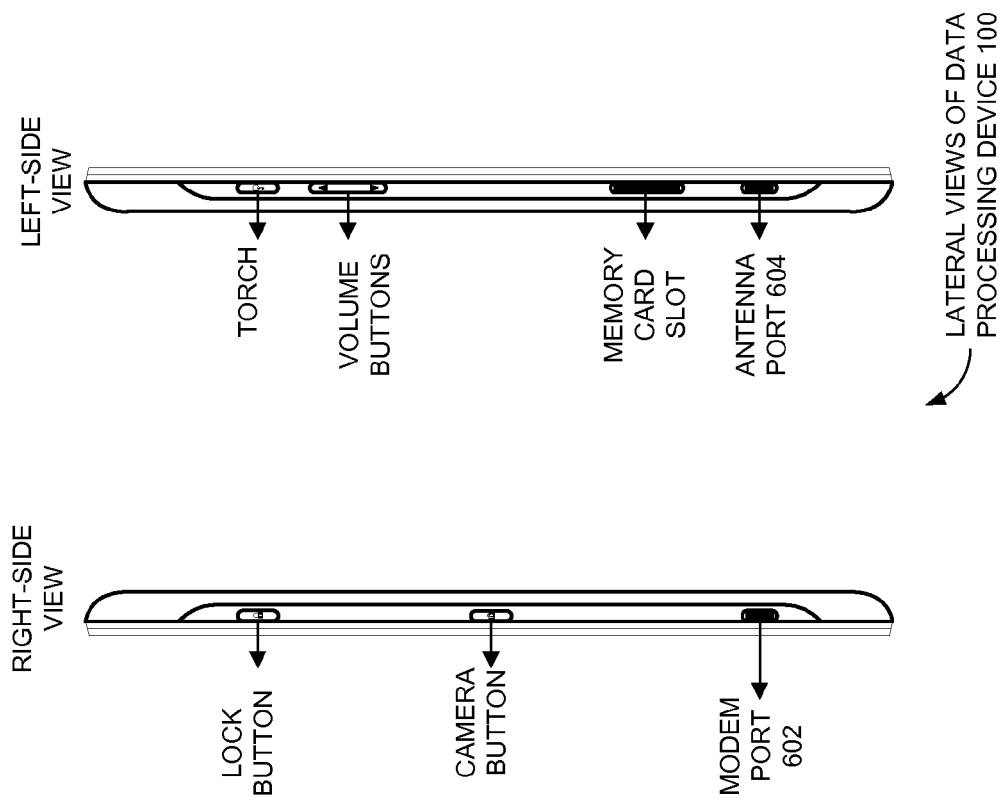
FIG. 6 is a set of lateral views of the data processing device of FIG. 1, according to one or more embodiments.

FIG. 6 shows lateral views of data processing device 100, according to one or more embodiments. The aforementioned lateral views serve to demonstrate other miscellaneous functionalities of data processing device 100. As shown in FIG. 6, some of the miscellaneous functionalities may be enabled through a lock button, a camera button, a memory card slot, volume buttons, a torch etc. It is obvious that other functionality enablers such as an earpiece slot, a charger slot et al. (not shown) may also be part of data processing device 100. FIG. 6 specifically shows modem port 602 to enable coupling of modem 502 to data processing device 100 and an antenna port 604 to enable coupling of antenna 400 to data processing device 100.

With regard to hinge 108, it should be understood that all possible 180° and 360° rotation mechanisms (and 180°-360° rotation mechanisms) are within the scope of the exemplary embodiments. Further, additional features such as image/desktop splitting/resizing enabled through components such as a multi-core graphics processor, a scratch-resistant oleophobic surface, a gyro sensor, an accelerometer, a proximity sensor for auto turn-off of data processing device 100, swipe text input capability, 3G/4G modem, various data capabilities, a camera with geo-tagging, touch focus, face/smile detection and/or image stabilization capabilities, analog television support, a port to connect to high-definition televisions/displays (e.g., through Mobile High-Definition Link) etc. may also be provided in data processing device 100.

Figure 7:
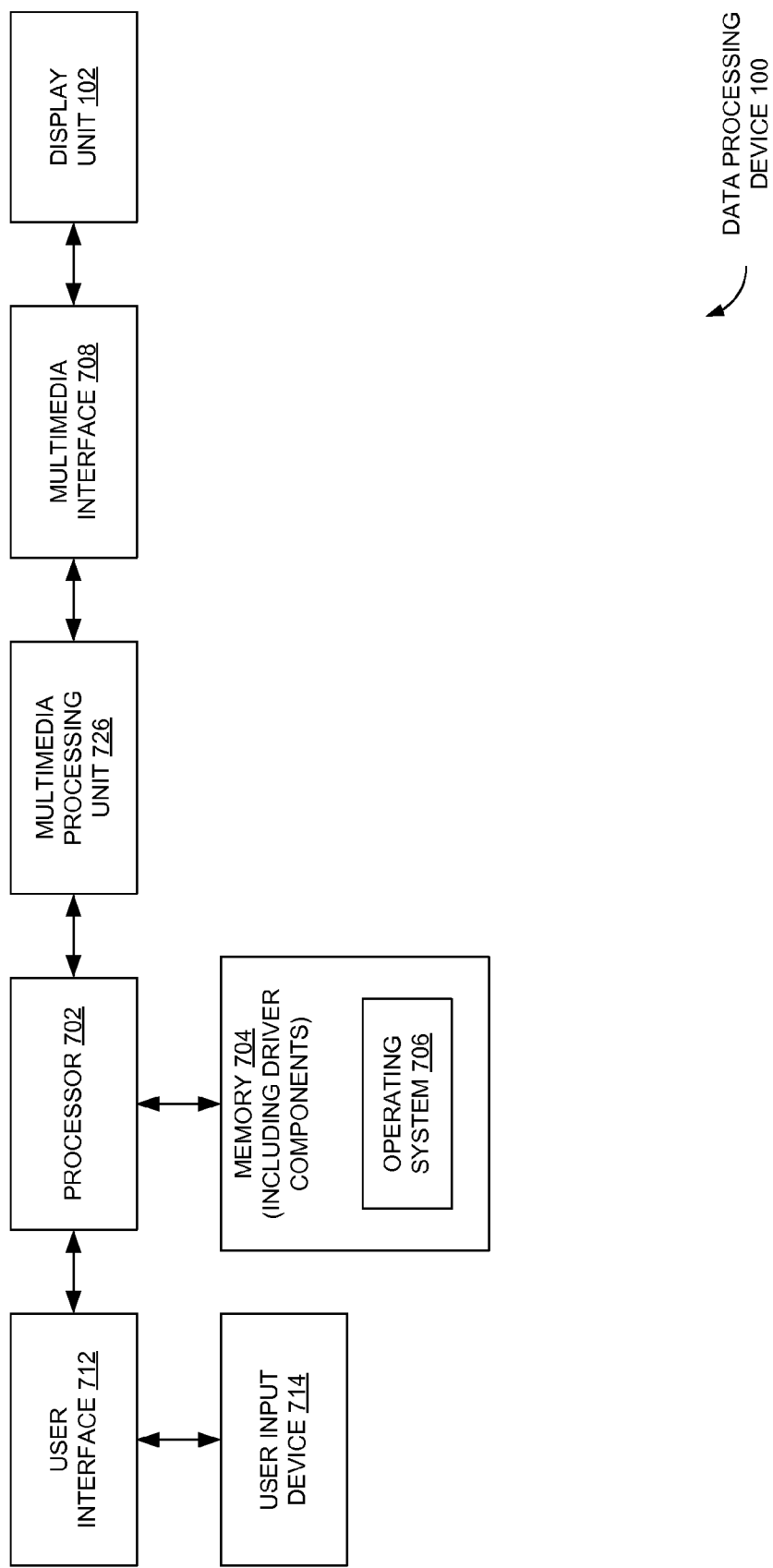
FIG. 7 is a schematic view of the data processing device of FIG. 1, according to one or more embodiments.

Thus, data processing device 100 may provide for a portable solution to requirements of user 150. User 150 may carry data processing device 100 in a pocket of his/her shirt/pants and may easily switch between the mobile phone and the computer features of data processing device 100. Further, user 150 may utilize data processing device 100 as a television as and when desired. FIG. 7 shows a schematic diagram of data processing device 100, according to one or more embodiments. In one or more embodiments, data processing device 100 may include a processor 702 (e.g., Central Processing Unit (CPU), Graphics Processing Unit (GPU)) communicatively coupled to a memory 704, processor 702 being configured to address storage locations in memory 704. In one or more embodiments, memory 704 may include a volatile memory (e.g., Random Access Memory (RAM)) and/or a non-volatile memory (e.g., Read-Only Memory (ROM)).

In one or more embodiments, output data associated with processing through processor 702 may be input to a multimedia processing unit 726 configured to perform encoding/decoding associated with the data. In one or more embodiments, the output of multimedia processing unit 726 may be rendered on a display unit 102 (e.g., Liquid Crystal Display (LCD) display, Cathode Ray Tube (CRT) monitor) through a multimedia interface 708 configured to convert data to an appropriate format required by display unit 102.

It is obvious that an operating system 706 (e.g., Android™) may execute on data processing device 100. FIG. 7 shows operating system 706 as being stored in memory 704 (e.g., non-volatile memory). In one or more embodiments, a user interface 712 (e.g., one of the several ports discussed above, an internal port) coupled to processor 702 may be provided in data processing device 100 to enable coupling of a user input device 714 (e.g., keypad 104) to processor 702 therethrough. In one or more embodiments involving data processing device 100, a touchpad (not shown) may be provided in proximity to (or on) keypad 104 on a plane utilized for user input.

All of the features and/or functionalities mentioned above may be provided through a number of user interfaces (e.g., user interface 712) of data processing device 100. Processor 702 may be configured to execute instructions associated with providing one or more capabilities. Modules (e.g., sets of instructions) associated with providing the aforementioned capabilities may be stored in memory 704 and executed on processor 702. Components associated with a mobile phone and a television are well-known to one or ordinary skill in the art. Therefore, FIG. 7 merely shows the barebones essentials of data processing device 100 for the sake of convenience and brevity.

Exemplary embodiments discussed herein may provide for increased user experience. Moreover, the full functionalities of keypad 104 may enable utilization of data processing device 100 outside the traditional scope of an individual mobile phone, an individual computer and an individual television set. It is obvious that operating system 706 (or, memory 704 as shown in FIG. 7) may be packaged with appropriate driver components (again, sets of instructions) to enable the full functionalities of keypad 104 and data processing device 100. Alternately, the aforementioned driver components may be available on a non-transitory medium readable through data processing device 100 (e.g., external memory) and installed therein or downloaded from the Internet into memory 704.

Figure 8:
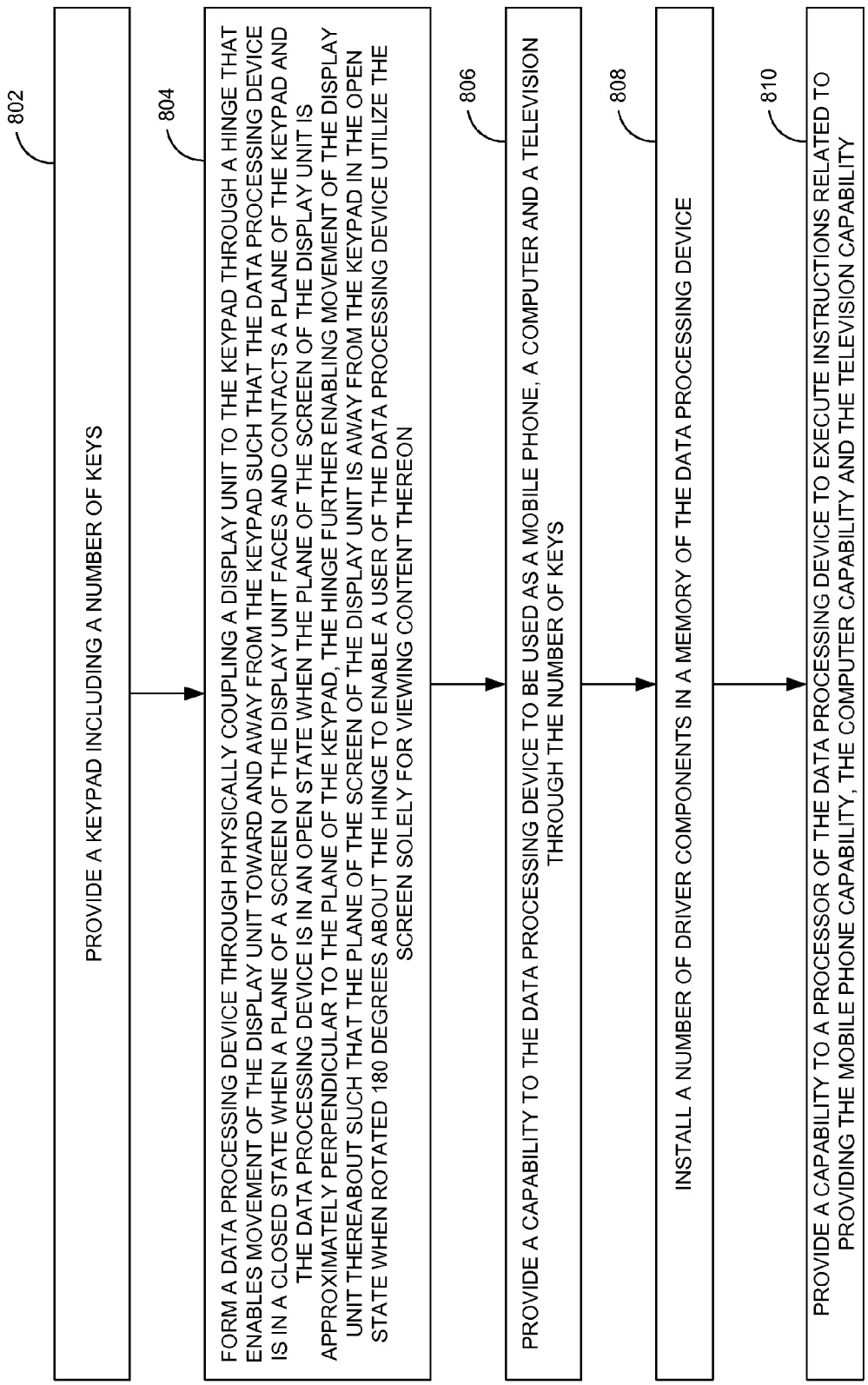
FIG. 8 is a process flow diagram detailing the operations involved in a method of realizing the functionally interchangeable data processing device of FIG. 1 having a rotatable display unit, according to one or more embodiments.

FIG. 8 shows a process flow diagram detailing the operations involved in a method of realizing a functionally interchangeable data processing device 100 having a rotatable display unit 102, according to one or more embodiments. In one or more embodiments, operation 802 may involve providing keypad 104 including a number of keys. In one or more embodiments, operation 804 may involve forming data processing device 100 through physically coupling display unit 102 to keypad 104 through hinge 108 that enables movement of display unit 102 toward and away from keypad 104 such that data processing device 100 is in a closed state when a plane of screen 110 of display unit 102 faces and contacts a plane of keypad 104 and data processing device 100 is in an open state when the plane of screen 110 of display unit 102 is approximately perpendicular to the plane of keypad 104.

In one or more embodiments, hinge 108 further enables movement of display unit 102 thereabout such that the plane of screen 110 of display unit 102 is away from keypad 104 in the open state when rotated 180° about hinge 108 to enable user 150 of data processing device 100 utilize screen 110 solely for viewing content thereon. In one or more embodiments, operation 806 may involve providing a capability to data processing device 100 to be used as a mobile phone, a computer and a television through the number of keys. In one or more embodiments, operation 808 may involve installing a number of driver components in memory 704 of data processing device 100. The number of driver components is related to providing the capability to data processing device 100 to be used as the mobile phone, the computer and the television.

In one or more embodiments, operation 810 may then involve providing a capability to processor 702 of data processing device 100 communicatively coupled to memory 704 to execute instructions related to providing the mobile phone capability, the computer capability, and the television capability to data processing device 100.

Figure 9:
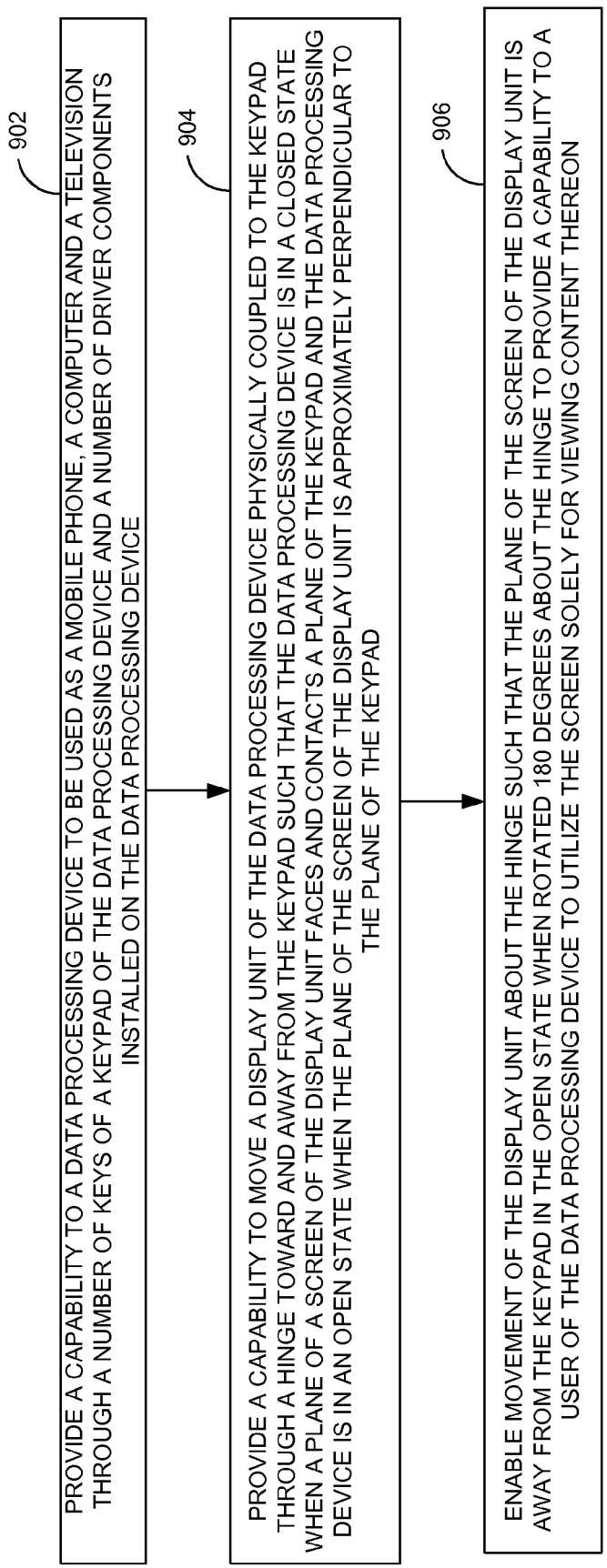
FIG. 9 is a process flow diagram detailing the operations involved in another method of realizing the functionally interchangeable data processing device of FIG. 1 having a rotatable display unit, according to one or more embodiments.

FIG. 9 shows a process flow diagram detailing the operations involved in another method of realizing a functionally interchangeable data processing device 100 having a rotatable display unit 102, according to one or more embodiments. In one or more embodiments, operation 902 may involve providing a capability to data processing device 100 to be used as a mobile phone, a computer and a television through a number of keys of keypad 104 of data processing device 100 and a number of driver components installed on data processing device 100. In one or more embodiments, operation 904 may involve providing a capability to move display unit 102 of data processing device 100 physically coupled to keypad 104 through hinge 108 toward and away from keypad 104 such that data processing device 100 is in a closed state when a plane of screen 110 of display unit 102 faces and contacts a plane of keypad 104 and data processing device 100 is in an open state when the plane of screen 110 of display unit 102 is approximately perpendicular to the plane of keypad 104.

In one or more embodiments, operation 906 may then involve enabling movement of display unit 102 about hinge 108 such that the plane of screen 110 of display unit 102 is away from keypad 104 in the open state when rotated 180° about hinge 108 to provide a capability to user 150 of data processing device 100 to utilize screen 110 solely for viewing content thereon.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., data processing device 100). Accordingly, the specification and drawings are to be regarded in an illustrative rather than a restrictive sense.

What is claimed is:

1. A data processing device comprising:
a keypad including a plurality of keys providing a plurality of functionalities to the data processing device during each use thereof as a mobile phone, a computer and a television;
a hinge;
a display unit physically coupled to the keypad through the hinge to enable movement thereof toward and away from the keypad such that the data processing device is in a closed state when a plane of a screen of the display unit faces and contacts a plane of the keypad and the data processing device is in an open state when the plane of the screen of the display unit is approximately perpendicular to the plane of the keypad, wherein further movement of the display unit about the hinge from the open state such that the plane of the screen of the display unit is away from the keypad when rotated 180° about the hinge enables a user of the data processing device utilize the screen solely for viewing content thereon based on the keypad being invisible to the user and a surface beneath the keypad being utilized as a stand to hold the display unit;
a memory including an operating system executing on the data processing device and a plurality of driver components related to providing a capability to the data processing device to be used as the mobile phone, the computer and the television; and
a processor communicatively coupled to the memory, the processor being configured to execute instructions to provide the mobile phone capability, the computer capability and the television capability to the data processing device,
wherein when an antenna is removably coupled to a port of the data processing device, the data processing device is capable of picking up a plurality of television signals to enable functionality thereof as the television, and
wherein the plurality of keys on the keypad vary in functionality of keys thereof when the data processing device transitions from the functionality thereof as the mobile phone to any of: the computer and the television.

2. The data processing device of claim 1, wherein at least one of:
the screen of the display unit possesses a touchscreen capability including a touchscreen keyboard interface, and
the keypad is a touchscreen based keypad configured to have an ability to adaptively change at least one of: virtual buttons and virtual keys thereof.

3. The data processing device of claim 1, wherein a key of the plurality of keys of the keypad provides a capability to access Internet through the data processing device.

4. The data processing device of claim 1, wherein the display unit is configured to have the capability to rotate 360° about the hinge.

5. The data processing device of claim 1, further comprising a modem port to enable coupling of a modem to the data processing device therethrough, the modem enabling Internet access through the data processing device.

6. The data processing device of claim 1, wherein at least one driver component enables at least one of screen splitting, desktop splitting, screen resizing and desktop resizing on the display unit of the data processing device.

7. A method comprising:
providing a keypad including a plurality of keys providing a plurality of functionalities to a data processing device during each use thereof as a mobile phone, a computer and a television;
forming the data processing device through physically coupling a display unit to the keypad through a hinge that enables movement of the display unit toward and away from the keypad such that the data processing device is in a closed state when a plane of a screen of the display unit faces and contacts a plane of the keypad and the data processing device is in an open state when the plane of the screen of the display unit is approximately perpendicular to the plane of the keypad, wherein further movement of the display unit about the hinge from the open state such that the plane of the screen of the display unit is away from the keypad when rotated 180° about the hinge enables a user of the data processing device utilize the screen solely for viewing content thereon based on the keypad being invisible to the user and a surface beneath the keypad being utilized as a stand to hold the display unit;
installing a plurality of driver components in a memory of the data processing device, the plurality of driver components related to providing a capability to the data processing device to be used as the mobile phone, the computer and the television;
providing a capability to a processor of the data processing device communicatively coupled to the memory to execute instructions related to providing the mobile phone capability, the computer capability, and the television capability to the data processing device;
removably coupling an antenna to a port of the data processing device to render the data processing device capable of picking up a plurality of television signals to enable functionality thereof as the television; and
varying, through at least one driver component, functionality of keys of the keypad when the data processing device transitions from the functionality thereof as the mobile phone to any of: the computer and the television.

8. The method of claim 7, further comprising:
providing a touchscreen capability to the screen of the display unit of the data processing device through a touchscreen keyboard interface; and
providing a touchscreen based keypad as the keypad such that the keypad possesses an ability to adaptive modify at least one of: virtual buttons and virtual keys thereof.

9. The method of claim 7, further comprising providing a capability to access Internet through the data processing device through a key of the plurality of keys of the keypad.

10. The method of claim 7, further comprising providing, to the display unit, a capability to rotate 360° about the hinge.

11. The method of claim 7, further comprising providing a modem port to enable coupling of a modem to the data processing device therethrough, the modem enabling Internet access through the data processing device.

12. The method of claim 7, further comprising enabling at least one of screen splitting, desktop splitting, screen resizing and desktop resizing on the display unit of the data processing device through at least one driver component.

13. A method comprising:
providing a capability to a data processing device to be used as a mobile phone, a computer and a television through a plurality of keys of a keypad of the data processing device and a plurality of driver components installed on the data processing device, the plurality of keys providing a plurality of functionalities to the data processing device during each use thereof as the mobile phone, the computer and the television;
providing a capability to move a display unit of the data processing device physically coupled to the keypad through a hinge toward and away from the keypad such that the data processing device is in a closed state when a plane of a screen of the display unit faces and contacts a plane of the keypad and the data processing device is in an open state when the plane of the screen of the display unit is approximately perpendicular to the plane of the keypad;
moving the display unit further about the hinge from the open state such that the plane of the screen of the display unit is away from the keypad when rotated 180° about the hinge provides a capability to a user of the data processing device to utilize the screen solely for viewing content thereon based on the keypad being invisible to the user and a surface beneath the keypad being utilized as a stand to hold the display unit;
removably coupling an antenna to a port of the data processing device to render the data processing device capable of picking up a plurality of television signals to enable functionality thereof as the television; and
varying, through at least one driver component, functionality of keys of the keypad when the data processing device transitions from the functionality thereof as the mobile phone to any of: the computer and the television.

14. The method of claim 13, further comprising at least one of:
providing a touchscreen capability to the screen of the display unit of the data processing device through a touchscreen keyboard interface; and
providing a touchscreen based keypad as the keypad such that the keypad possesses an ability to adaptive modify at least one of: virtual buttons and virtual keys thereof.

15. The method of claim 13, further comprising providing a capability to access Internet through the data processing device through a key of the plurality of keys of the keypad.

16. The method of claim 13, further comprising providing, to the display unit, a capability to rotate 360° about the hinge.

17. The method of claim 13, further comprising providing a modem port to enable coupling of a modem to the data processing device therethrough, the modem enabling Internet access through the data processing device.

* * * * *